United States Patent [19]

Bühler et al.

[11] Patent Number: 4,473,526

[45] Date of Patent: Sep. 25, 1984

[54] METHOD OF MANUFACTURING DRY-PRESSED MOLDED ARTICLES

[75] Inventors: Eugen Bühler, Schleifweg 3, D-8871 Burtenbach; Klaus Strobel, Selb; Karl Schwarzmeier, Selb-Oberwessenbach, all of Fed. Rep. of Germany

[73] Assignees: Eugen Bühler, Burtenbach; Hutschenreuther AG, Selb, both of Fed. Rep. of Germany

[21] Appl. No.: 224,037

[22] Filed: Jan. 12, 1981

[30] Foreign Application Priority Data

Jan. 23, 1980 [DE] Fed. Rep. of Germany ....... 3002230

[51] Int. Cl.³ ............................................ B29J 5/00

[52] U.S. Cl. .................................... 264/517; 264/121

[58] Field of Search ............................... 264/121, 517

[56] References Cited

U.S. PATENT DOCUMENTS

| | | | |
|---|---|---|---|
| 3,099,045 | 7/1963 | Honkanen | 264/121 |
| 3,338,999 | 8/1967 | Knapp | 264/121 |
| 3,726,954 | 4/1963 | Munk | 264/121 |
| 4,191,726 | 3/1980 | Stillhard et al. | 264/121 |

*Primary Examiner*—James R. Hall

*Attorney, Agent, or Firm*—Toren, McGeady and Stanger

[57] ABSTRACT

In a method of manufacturing dry-pressed molded articles from essentially dry, pourable ceramic metal or carbon-containing molding compound in a mold of one or more parts, it is proposed to generate a negative pressure through the mold wall in the hollow space of the mold and, by means of the pressure difference generated as a result, to propel molding compound which is under pressure, for example, atmospheric pressure, through an injection opening into the hollow space of the mold and to precompress the molding compound in the mold while deaerating the molding compound, and that subsequently, the pneumatically precompressed molding compound is compression molded into a molded article having the desired final density.

11 Claims, 4 Drawing Figures

METHOD OF MANUFACTURING DRY-PRESSED MOLDED ARTICLES

SUMMARY OF THE INVENTION

The invention relates to the manufacture of dry-pressed molded articles from fine-grained material. For this purpose, pourable molding compounds are pressed into molded articles by mechanical, hydraulic or isostatic presses. The molding compounds have a moisture content of generally less than 2% and possibly contain certain additions of organic or inorganic plasticizers or binders and are generally composed of oxide-ceramic or metal-ceramic materials or of metal powders or carbon powders. The molded articles are used either as ceramic casing cores in the green state in the ceramics and refractory industries, or in powder metallurgy as blanks which are subsequently burned or sintered to obtain intermediate or finished products.

In burning, sintering or casting of dry-pressed ceramic molded articles, occasionally cracks, deformations or chipping-off may occur, primarily due to the formation of layers in the molded articles and caused to a large extent by air entrapped during the compression-molding process or by a non-uniform distribution of the material in the compression mold.

For avoiding entrapped air, it is known to fill the mold with molding compound in a vacuum and to press the compound under vacuum. However, since the compound is filled into the mold from a flat, movable metering vessel arranged inside the vacuum chamer, this method is best suited for pieces with wall thicknesses, such as, tile blanks (cf. West German Offenlegungsschrift 23 03 432 and West German Auslegeschrift 22 44 698).

On the other hand, in the manufacture of profiled molded pieces having varying thicknesses, for instance, in dish blanks or foundry cores, a uniform distribution of the compound must be achieved to avoid zones of different degrees of compression within the molded piece. To meet this requirement, it is known from West German Offenlegungsschrift 25 25 085 to blow the compound by means of compressed air from a vessel into the hollow space of the mold between the bottom die and the slightly raised top die. Since a considerable amount of air is trapped during this process, the subsequent pressing process must be carried out in two stages, wherein the trapped air is pushed out through the clearance spaces in the mold during the precompression phase. A sufficient deaeration of the compound is not always ensured in this method.

Another method of filling a mold utilizes centrifugal force. In that method, the compound is introduced into a rotating mold. Since the centrifugal force changes and increases depending on the diameter, a uniform distribution of the compound is also not ensured, particularly not in the case of non-circular molded pieces having ribs, such as, mess dishes, or in the case of molded pieces having non-radial wall performations, such as, pump impeller cores.

A satisfactory deaeration of the molding compound and a simultaneous compression of the molded article can be achieved in isostatic presses if certain preparatory measures are taken. This method not only requires expensive isostatic presses which, as is well known, last only for a limited number of cycles, but it also requires in the processing of oxide-ceramic porcelain materials, a compound with hard grain which has been carefully prepared in the spray-drying process and from which dust has been removed. When soft granulate is molded isostatically, the grain is frequently destroyed at the beginning of molding. This means that the dearation of the molded piece is delay. In addition, to obtain crack-free molded pieces, the subsequent compression must be performed in stages, and as a result, the hourly output of the press decreases even further.

In contrast, in the manufacture of molded pieces from isostatically hot-pressed metal powders, molded articles are used which have already been compressed to at least 70% of the theoretical density in a precompression process. To achieve a uniform final density, the metal powder is conventionally vibrated into a sheathing tube, it is then cold-compression-molded by means of the sheathing tube, and the precompressed molded article is mechanically finished prior to insertion into the isostatic hot press.

Therefore, it is the object of the invention to provide a method and suitable apparatus for manufacturing dry-pressed molded articles from pourable material, wherein the molded articles may have a complicated shape and wherein a molding compound of relatively soft granulate which contains a larger amount of dust, and portions as small as possible of organic lubricants or plasticizers, can still be processed into molded pieces which are completely deaerated and uniformly compressed at all points even when the molded pieces have different wall thicknesses, and where the cycle time for the molding process, as determined by machine output, does not have to be delayed by deaeration periods. This method should not be limited to oxide-ceramic materials but should also facilitate the manufacture of molded articles from pourable metal-ceramic compounds or from metal or carbon powders. In addition, it should be possible to use existing mechanical, hydraulic or isostatic presses, while the costs of retooling for the new method are not excessive.

This object is met by using the vacuum or injection principle for filling the mold with relatively dry molding compound and pressing the compound into a deaerated and precompressed state determined by the filling procedure.

In the use of a vacuum to fill molds, various parameters must be observed, if satisfactorily precompressed and deaerated molded articles are to be obtained. In a given type of molding compound, the degree of precompression, to wit, the filling factor, depends essentially upon the speed of impact of the individual molding compound particles in the hollow space of the mold. The impact speed is not only influenced by the pressure difference between the outside pressure and the pressure in the hollow space of the mold, but also significantly by its shape. Particularly when the molds have complicated shapes, so-called "injection shadows" can be formed within the hollow space of the mold which result in loose spots in the molded article.

To avoid such loose spots, the flow velocity of the compound particles in the hollow space of the mold must be kept as uniform as possible during the filling procedure. This can be achieved by drawing off the air to varying degrees over the entire area of the hollow space of the mold. Accordingly, for each molded article and each type of molding compound, the most favorable locations for drawing off air in the mold must be determined with respect to their positions and cross-sectional areas.

Advantageously a housing is used which can be pressure-tight and has a feed opening for molding compound and can be connected to a suction device. A mold which, for economical reasons, can be formed of an inexpensive and easily workable material, such as, wood or reinforced plastics material, can be introduced into this housing, and after connecting its injection opening with the feed opening, a partial vacuum can be applied in such a way that the partial vacuum acts uniformly on all its external surfaces. The partial vacuum which is generated in the housing either suddenly or at a controllable rate propogates into the hollow space of the mold through clearance spaces between individual mold parts and through air discharge openings which are arranged in the mold wall and provided with filter inserts, for example, self-cleaning slot nozzles, and draws into the mold compound which is under external pressure. Subsequently, the air pressure in the chamber is equalized, and the mold is removed and opened. By means of a mold hardness testing device, the molded article can now be tested for locally uniform compression. At those spots where the molded article is compressed insufficiently, it is easily possible to provide additional air discharge openings in the mold wall, while in those spots where the compression of the molded article is sufficient or excessive, existing air discharge openings can be reduced in their effective cross-sectional area or can be closed entirely by covering them with strips of self-adhesive film, for example, scotch tape. By repeating these injection experiments and evaluating the findings, it is not only possible to determine the optimum arrangement of the air discharge nozzles in the mold, but also the most favorable values for the generation of the vacuum in the hollow space of the mold with respect to time and magnitude, the size and shape of the feed opening for the molding compound, the possible necessity and suitability of a closing member to be provided for the feeding opening and the manner of feeding the molding compound to the injection opening.

In the experiments with various types of mold compounds it was found that the build-up of the molded article from the molding compound filled into the hollow space of the mold progresses approximately hemispherically from the periphery toward the injection opening. As a rule of thumb, a so-called "one-sixth relationship" was found to be a most advantageous arrangement of the air discharge openings. In accordance with this rule, advantageously 3/6 of the effective suction area resulting from the clearance spaces between the individual mold parts and the air discharge openings in the mold walls are provided in that region of the mold which surrounds 1/6 of the volume of the hollow space of the mold which is most remote from the injection point. 2/6 of the suction area is distributed, decreasingly toward the injection opening, over those mold wall regions which surround the next 2/6 of the volume of the hollow space of the mold, while the last 1/6 of the cross-sectional area is provided in that region of the mold wall which surrounds the last 3/6 of the mold volume toward the injection opening.

This relationship is not inflexible, but, in addition to the shape of the hollow space of the mold, is primarily also influenced by the physical properties of the respective molding compound. When molding compounds of low specific gravity and gas permeability are supplied, such as soft porcelain compounds having high dust contents, it is usually necessary to distribute the cross-sectional suction area over the entire surfaces defining the hollow space of the mold. When relatively heavy metal granulates with high gas permeability are processed, a stronger air suction in the peripheral areas is possible.

As a result of the above, a molded article is finally obtained which is practically uniformly precompressed and, assuming sufficient green stability of the processed molding compound, can be directly placed into the pressing tool of a hydraulic or mechanical press. As a rule, the results and findings determined by the use of wood or plastics molds will be transferred to metal molds in which the molded article will eventually be produced by filling under a partial vacuum. This reduces not only the cycle period, but, depending on the type of press used, also the compression molding of the pneumatically precompressed molded article while maintaining the partial vacuum built up in the hollow space of the mold during the filling procedure.

BRIEF DESCRIPTION OF THE DRAWING

The invention shall now be explained with the aid of sketch representations. In the drawing.

DETAILED DESCRIPTION OF THE PREFERRED EMBODIMENTS

Figure 1:
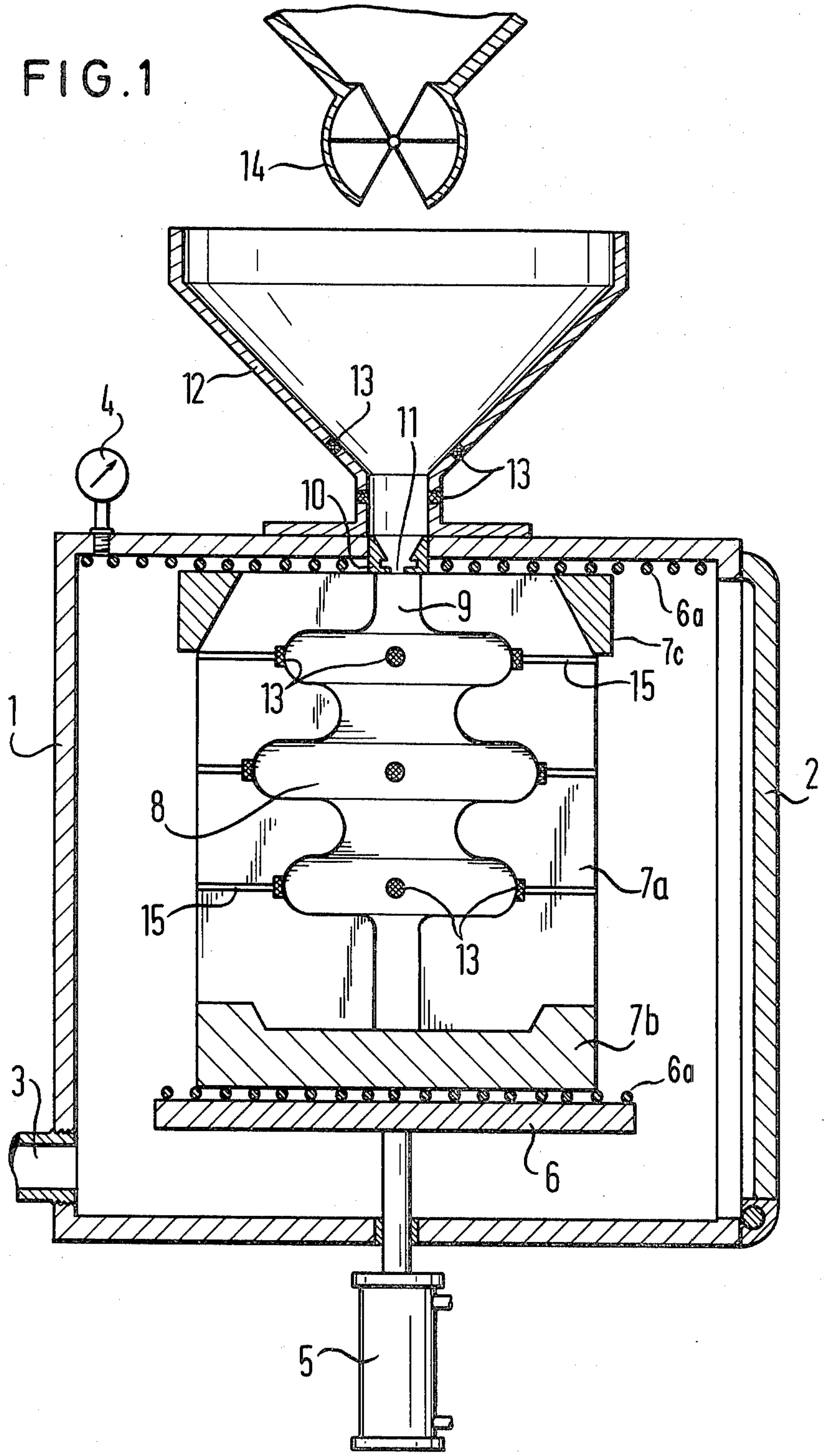
FIG. 1 shows a mold for a rotationally symmetrical body with ribs, such as, an electrical insulator arranged in a pressure tight housing.

The apparatus illustrated in FIG. 1 includes a housing 1 closed by a tilting door 2 and on one side has a suction pipe 3 which, via a pneumatic control device, not shown, connects the housing with a suction device, for example, a large vacuum vessel which is ventilated by means of a water ring pump. The pressure conditions—or vacuum conditions—in the housing can be monitored by means of a measuring device 4, for example, a pressure recorder. The piston rod of lifting device 5 slides in a sealed manner through the bottom of the housing 1. The lifting device 5 vertically adjusts a table 6 whose surface is provided with a woven wire mesh 6*a*, as is the bottom side of the top cover of the housing. A mold composed of a mold positioned between a lower mold part 7*b* supported on table 6 and an upper conical ring 7*c*. As illustrated, the mold is constructed in three parts for forming a rotationally symmetrical body with ribs. The mold part 7*a* which surrounds the hollow space 8 of the mold is divided radially, not shown, into two parts and has air discharge openings 15. Mold part 7*a* is inserted in a conical recess of the lower mold part 7*b*. At the top, the mold parts are held together by the conical metal ring 7*c*.

The mold is pressed against the top cover of the housing 1 by means of the lifting device 5 so that the upper portion of the hollow space of the mold, which forms an injection opening 9, is connected in an air-tight manner, relative to the remaining housing space, to the inlet opening 11 located within an injection mouthpiece 10 arranged replaceably in the top cover of the housing. Inlet opening 11 can be closed by a stop device, not shown. For example, the stop device may be a gate valve, an automatically operating valve with rubber lips constructed as a one-way valve or, when ferromagnetic powders are processed, an annular coil which is arranged in the injection mouthpiece and to which a reversible direct current can be applied.

An advantageously funnel-shaped molding compound vessel 12 is arranged above the injection mouthpiece 10. Air passage openings provided with filter inserts 13 are arranged in the lower wall portion of vessel 12. During the filling procedure, the air passage openings facilitate access of fluidizing air into the molding compound directed into the hollow space in the mold and, if necessary, they can be easily closed by covering them with adhesive film.

The molding compound vessel 2 may contain a supply of molding compound which exceeds the volume of the hollow space of the mold. The vessel may also serve as a catching and conducting device for a measured amount of molding compound supplied to the inlet opening from a metering device 14, for example, a star feeder in a free fall. Finally, the molding compound vessel may also consist of an excess pressure injection head, known per se.

Before the apparatus is put into operation, first the size and shape of the inlet opening 11 must be adapted to the molding compound to be used. For this purpose, an injection mouthpiece with calibrated inlet opening is selected so that the molding compound no longer pours out at equalized pressure either before or after the injection. It may also be necessary to select an injection head with a stop device suitable for the respective molding compound.

The injection mouthpiece 10 is screwed into the top cover of the housing 1 and the mold is placed on the table 6 and pressed against the top cover of the housing by the lifting device 5. In those regions where, according to general experience, loose spots can be expected in the molded article, the mold is provided with air discharge openings 15 which are drilled through the mold wall and secured by means of filter inserts 13. When pressing the mold against the top cover of the housing, a small portion of the mold wall around inlet opening 11 comes into air-tight contact with the sealing surface of the injection mouthpiece 10 inserted into the top cover of the housing. The door 2 of the housing is closed and air is evacuated through the suction pipe 3 in a controlled manner by means of a control device, not shown. The vacuum generated in the housing acts on all external surfaces, to wit, not only the lateral surfaces, but also the bottom and top surfaces of the mold and propagates into the hollow space of the mold through the air discharge openings 15 in the mold wall. The pressure difference effective between the hollow space of the mold and the external pressure causes molding compound to be propelled more or less suddenly into the hollow space of the mold from the previously filled open molding compound vessel 12 depending upon the rate of generation of the vacuum in the hollow space of the mold and the size of the inlet openings, so that the molding compound is precompressed and deaerated.

Subsequently, the vacuum in the housing is cancelled by the above-mentioned control device, the door is opened after the pressure compensation and the mold is removed.

With the aid of the molded article produced in the mold, it is possible to draw conclusions with respect to the propulsion behavior of the molding compound and the requirement of possibly arranging further air discharge openings in various regions of the mold wall, or of modifying the already existing openings.

The propulsion capability of the molding compound can be improved by fluidizing the compound by admixing air during the propulsion step. For this purpose, the initially covered filter inserts 13 in the lower portion of the molding compound vessel are opened, so that air is automatically drawn in with the molding compound during propulsion. This fluidizing effect can be increased by supplying the molding compound in metered amounts to the inlet opening in a free fall, and not from a supply in the molding compound vessel.

In areas where the compression of the molded article is insufficient, additional air discharge openings 15 are drilled into the mold wall and are provided with filter inserts 13 until a satisfactory uniform compression is achieved in all locations. The results empirically determined in this manner are evaluated and advantageously transferred to a metal compression mold in which the molded articles can be directly post-compressed mechanically or hydraulically.

Due to the time required for inserting the mold, closing the housing, and subsequent mold removal from the housing, the manufacture of molded articles in the above-described apparatus will generally be limited to a small number of molded articles. The apparatus is also limited to cases where air must be drawn off through the top surface of the mold and in those locations which are undercut and in the injection shadow, which is frequently the case in ceramic casting cores. For larger members of molded articles, the findings obtained in this apparatus with respect to the arrangement and size of the air discharge openings, the time period and magnitude of the vacuum (negative pressure) to be produced, and the manner of supplying the molding compound will be utilized to build an apparatus which permits faster work cycles.

Figure 2:
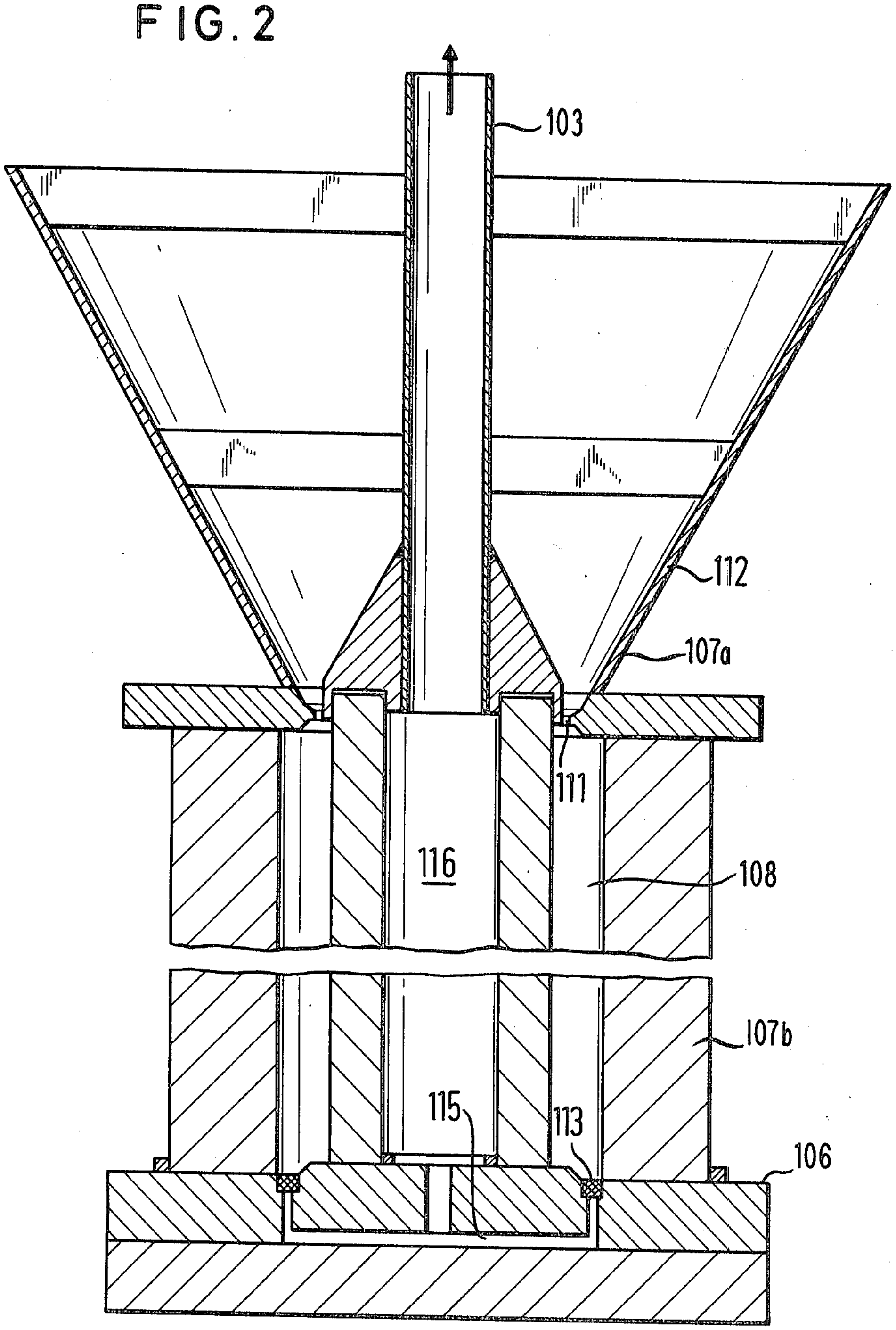
FIG. 2 shows a compression mold for a refractory pipe used as flue linings or as pouring pipes in steel production and, in the past, have been primarily pressed from plastic chamote batches having a moisture content of 14–16%.
Figure 3:
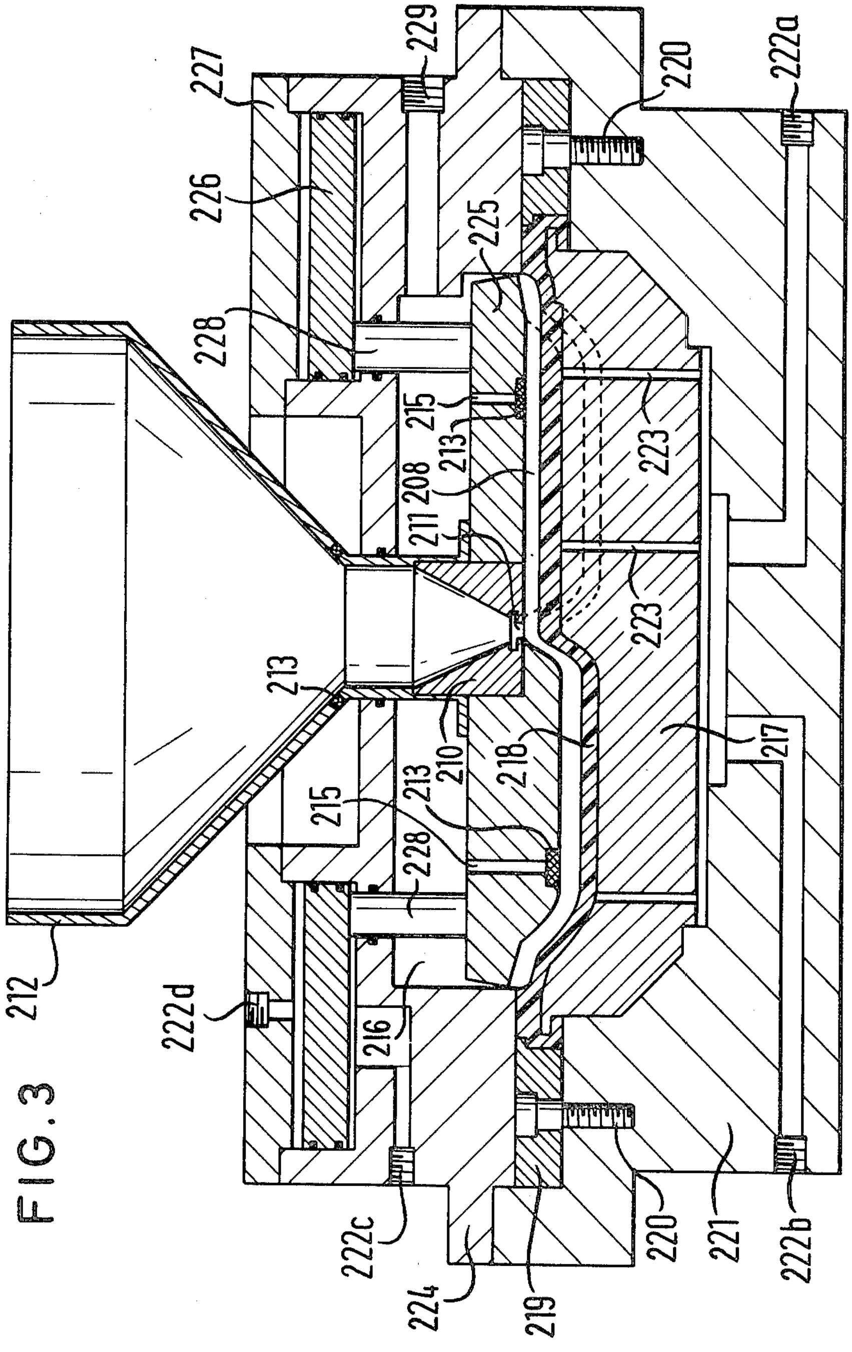
FIG. 3 shows a compression mold for a porcelain dish, wherein the mold has been created by retooling an existing isostatic compression mold for the method according to the invention.

Examples for such apparatus are illustrated in FIGS. 2 and 3. The mold illustrated in FIG. 2 consists of two tubular parts **107*a*, 107*b* arranged concentrically one within the other and placed on a bottom plate 106 containing air discharge openings 115 provided with filter inserts 113 and define the hollow space 108 of the mold. An injection head is mounted on the upper end of the tubular parts. The injection head consists of a funnel-shaped molding compound vessel 112, open at the top and with a suction pipe 103 extending through its center. The lower end of the vessel 112 has an annular shape corresponding to the shape of the hollow space 108 of the mold, and forming an annular inlet opening 111** for the molding compound.

When air is drawn off through the suction pipe 103, the vacuum propagates through the chamber 116 in the tubular part **107*a*, the air discharge openings 115 and the filter inserts 113 onto the hollow space 108 of the mold and propels the molding compound from the vessel 112 into the hollow space 108 in the mold and fills the hollow space. The inlet opening 111 may be divided into a number of annularly arranged individual inlet openings. As a result, the molding compound consisting essentially of granular chamotte containing a small portion of bonding clay, is compressed so that, after removal of the injection head, the mold consisting of the two tubular parts 107*a*, 107*b* can be raised from the bottom plate 106** and transferred into a press, without any loss of the molding compound. In the molding press, the molding compound is then compressed by an axial force and the molded article is pressed out of the mold, and the individual mold parts can be combined with the injection head for a new cycle.

When propulsion molding chamotte pipes of short and compact shape is used, for example, as protective pipes on foundry ladle closures, the air suction through the bottom plate alone is sufficient for obtaining a uniform precompression of the molded article. In contrast, in the manufacture of long pipes with thin walls, for example, flue linings, an additional air suction through the inner mold part may be required in accordance with the above-explained "one-sixth relationship". Since, due to the sliding movement of the molded article when it is displaced out of the mold space, the arrangement of conventional air discharge openings in the wall of the tubular mold part may be disadvantageous, and air discharge openings to be arranged in the mold wall are advantageously provided with inserts of sintered porous metal whose surface is formed flush with the surface of the mold. Any blockages which may occur in the course of time due to dust drawn in from the molding compound can be blown free again by back flushing with compressed air.

To increase the number of articles molded, a plurality of the above-described molds can be combined into a multiple mold unit, if the press capacity permits it. The filling and compressing procedure can be mechanized by a turnstile or turntable, so that the output can be further increased.

The compression mold illustrated in FIG. 3 is composed of a bottom mold which is taken practically unchanged from an existing and known isostatic press for dishes. This bottom mold has a membrane 218 formed of a rubber or elastic plastics material placed in an insert 217. An annular flange 219 protrudes over the edge of the membrane. The flange 210 and screws 220, fix insert 217 and membrane 218 on a housing body 221. A pressurized fluid can be admitted into contact with the side of the membrane 218 facing the insert 217. The pressurized fluid is supplied through a pressure fluid line **222*a* in the housing body 221, and flows through ducts 223 in the insert 217 to predetermined points on the membrane and can be discharged through another pressurized fluid line 222*b*** in the housing body.

A top mold is connected in a pressure-tight manner to the bottom mold, but it can be lifted off and swung out. In accordance with the invention, the top mold is constructed as an injection head. The top mold includes a cylinder portion 224 engaged in a corresponding recess of the housing body 221. The cylinder portion 224 has an outer flange supported on the end face of a collar **221*a* of the housing body. In a recess in the cylinder portion 224, corresponding to the outer contour of the molded article to be produced, a shaping die 225 is vertically adjustably supported. The hollow spaces 208 of the mold is defined by the membrane 218 and the surface of the die 225 facing the membrane in the bottom mold. Further, an annular piston 226 is vertically adjustably supported in the cylinder portion 224. A pressure medium is admitted to both sides of annular piston 226 through a pressure fluid line 22*c* in the cylinder portion cover 227. Through rams 228, the annular piston effects the vertical adjustment of the die 225. A molding compound vessel 212 is flanged onto the upper side of the die on the opposite side from the hollow space 108 of the mold. The lower cylindrical part 210 of the vessel 212 and the rams 228 extends through a chamber 216 formed between the die 225 and the inside vertical wall of the cylinder portion 224. An air line 229 is connected to the chamber 216**.

The sliding surfaces of the rams 228 and the lower cylindrical part 211 of the molding compound vessel 212 in the wall of the cylinder portion 224 are secured by means of seals **228*a*, 210*a* against the penetration of oil or air into the chamber 216. The vessel 212 has an inlet opening 211 in communication with the hollow space 208 of the mold. The molding compound vessel 212 is open at its top for facilitating the feeding of molding compound into the hollow space 208 of the mold. In the manner described above, the size of the inlet opening is carefully adapted to the properties of the compound to be processed. Accordingly, a problem-free injection of the compound into the hollow space 208** of the mold during filling is possible. The possibility that compound flows out in an uncontrolled manner prior to filling or when the top mold is raised, or that the compound retreats during molding is avoided.

Therefore, for easily and quickly performing the adapting operations during the change to another molding compound type, an injection mouthpiece 210 is replaceably inserted in the lower end of the molding compound vessel. The mouthpiece 210 extends partially through the die 225 and includes the inlet opening 211 to the hollow space 208 of the mold. This injection mouthpiece 210 is constructed in such a way that it can receive a stop member which, in the present case, is a rubber lip valve which automatically opens at a certain pressure difference, acts as a one-way valve and closes and can be subjected to a load in the opposite direction.

The hollow space 208 of the mold can be evacuated. In addition to the clearance space required between the die 225 and sliding surfaces in the cylinder portion 224, the air penetrates toward the chamber 216 primarily through air discharge openings 215 in the die which are secured against a penetration of molding compound toward the chamber by means of filter inserts 213. The die can also be formed entirely or partially of sintered porous metal.

The top mold described above takes the place of a molding compound metering device which can be swung onto the bottom mold and lowered thereon. The air line 229 is connected to a pneumatic control device, not shown, which makes possible a timed connection of the chamber 216 with a vacuum unit, for example, a vacuum tank which can be evacuated by a water ring pump, a compressed-air source or the outside atmosphere. The pressure fluid lines **222*c* and 222*d*** are connected to a suitable hydraulic control device.

The isostatic press retooled in this manner operates as follows:

Molding compound is filled into the molding compound vessel 212 and the injection head is swung above the bottom mold and is lowered thereon. Subsequently, by means of a pressure medium pumped in or pumped out through the pressure fluid lines **222*c*, 222*d*, the die force 225 is adjusted to a level which determines the wall thickness of the precompressed molded article. This wall thickness is slightly greater than the final wall thickness of the molded article after the pressing procedure and is determined by experiment. The determined values can be marked on the molding compound vessel 212 moved by means of the ram and can be automatically measured by means of the hydraulic control device. Subsequently, through the pneumatic control device, the chamber 216 is connected to the suction device and is suddenly evacuated. The vacuum propagates into the hollow space 208 of the mold through the gap between the die 225 and the cylinder portion and through the air discharge openings 215 in the die 225 and draws molding compound through the inlet opening 211 which fills the hollow space 208 in the mold. While the chamber 216 is still under a vacuum, the molding compound in the hollow space 208 of the mold is compressed into a molded article by means of pressure medium pumped in the pressure fluid line 222***a*. This compression procedure can take place on one side from the membrane 218, however, it can also take place from both sides by means of pressure medium pumped in through the pressure fluid line 222*d*.

A short time prior to cancelling the molding pressure, the vacuum is discontinued and a slight excess pressure is applied to the chamber 16 by the pneumatic control device. This additional pressure not only causes a slight raising of the die 225 from the molded article, but it also prevents molding compound from flowing through the inlet opening 211 onto the molded article. The injection head is then raised from the bottom mold and is swung out.

The molded article produced in this manner may have mold marks of the filter inserts 213 on its surface and a casting patch or button at the injection point. If these surface defects—as in the presented case in which the round dish has been pressed with its use side facing upwardly—are tolerable, the top mold with smooth mold wall which is also present in the press used is swung in the molded article is after-compressed in the original mold. In a mold that has to be newly built, the dish would advantageously be arranged in the mold so that the inlet opening 11 and the filter inserts 13 are located on the back side of the dish opposite the use side.

The invention is not limited to the embodiments described and illustrated in the drawings. The method according to the invention also makes possible the advantageous manufacture of various molded articles in other shapes of oxide-ceramic material whose blanks are today still cast or compressed from wet plastic batches, such as, spark plugs, porcelain dishes, ceramic cores for steel casting, refractory ceramic wearing parts in foundry ladle or smelting furnace closures, refractory wearing material in steel plants, such as runner bricks and the like, and also the manufacture of molded articles from metal-ceramic or metal powders which are used as blanks in powder metallurgy. Any deviations from the embodiments resulting from the shape of the molded articles to be produced or the mechanization of the mold filling and/or compression molding procedure are within the scope of the invention.

The following aspect is of substantial importance for the method according to the invention:

When the molding compound is drawn into the hollow space of the mold, there is the danger that the initial molding compound particles drawn in cause blocking of the points where air is drawn off for generating the vacuum so that the further suction of air is impaired or prevented. This danger is especially great when the particles of a molding compound are broken when they impinge at high speed upon the parts of the hollow space of the mold which define the suction points. This is particularly true when spray-dried ceramic materials are used as molding compound.

Therefore, it is suggested in accordance with the invention, at least when the filling of the hollow space is commenced, the molding compound particles are introduced so that compacting of the compound is avoided which would prevent further removal of the air.

When it is stated that compacting should be avoided, filling of the hollow space is started, the following should be considered:

Once the molding compound particles have been deposited in the areas of the suction openings in a relatively porous manner permitting the continued removal of air, filter packings having a relatively large surface area are present at the suctions points, so that blocking is prevented even when a more compact packing is produced in the further sequence of the filling of the hollow space. For this reason, it is particularly important to avoid compacting the compound which would prevent the drawing-off of air, especially at the beginning of the filling of the hollow space.

Any compacting further preventing the drawing-off of air can be avoided by appropriately adjusting the impact speed of the molding compound particles at the suction points.

One possibility for controlling the impact speed of the molding compound particles at the suction points is that, at least at the beginning of the filling step, secondary air is introduced into suction line or the discharged air in the suction line is throttled. As a result, the entering speed of the molding compound particles is reduced.

After this slow initial phase, the supply of secondary air is stopped or the throttling of the discharged air is cancelled. During the filling of the hollow space which now follows more quickly, the resistance of the air passing through rises quickly, so that it would also be possible to stop the supply of the secondary air or to cancel the throttling of the discharged air over the period of the filling procedure.

An additional possibility for avoiding undesirable compaction at the suction points resides in introducing the molding compound particles into the hollow space in a direction not directly aimed toward the suction points. When the molding compound particles have been subjected to one or several deflections and/or impacts after entering the mold, their impact speed at the suction points is usually reduced so that no compaction occurs preventing the further removal of air.

When the molding compound consists of easily breakable individual grains, it must be ensured that no destruction of the grains and particularly of the larger grains occurs upon impact of the grains at or adjacent to the air suction points because, in the case of such destruction, the porosity of the grains at the suction points would be reduced and, therefore, the danger of blocking would result. Particularly the large grains maintain a certain porosity at the suction points, so that, in the case of molding compound having a spectrum of grains of different sizes, it is important to adjust the impact speed at the suction points whereby at least a portion of the relatively large individual grains remain intact.

To ensure that the molding compound grains do not enter the suction points, it is essential that the suction points have at least one linear cross-sectional dimension smaller than the linear dimension of the predominant portion of the molding compound grains.

The spray-dried ceramic materials shall be discussed once again. They are of particular importance for the method of the invention because they have an especially good flowing capability and, therefore, are especially suitable for a uniform distribution affording a uniform density over the entire volume of the molded article to be produced. The spray-dried ceramic materials, however, are especially sensitive to destruction upon impact at high speed with a wall in the hollow space of the mold. Because the grains of these spray-dried ceramic materials are predominantly hollow spheres there is the danger that the hollow spheres are broken when impinging upon the parts of the hollow space surrounding the suction points. Accordingly, blockages of the suction points occurs whereby, after the initial filling of the hollow space in the regions of the suction points, further filling of the hollow space of the mold cannot take place or cannot take place with the required uniformity of the distribution of the compound over the entire hollow space.

In the manufacture of ceramic molded pieces, for example, tableware pieces, the cross-sectional area of the inlet opening can be selected at any size, since when the cross-sectional area of the inlet opening is too large, the shape of the tableware piece would no longer be defined in this area and would have to be after-processed. Accordingly, the problem of filling the mold space exists particularly where the inlet opening has a relatively small cross-section. In this case the feed speed is especially high and it is all the more important to ensure that such speed does not lead to high impact speeds of the molding compound particles at the suction points.

The conditions set forth above shall now be considered with the aid of the embodiment in FIG. 3:

Vent line 229 shall be connected to a large volume vacuum tank, for example, $2m^3$ which, in turn, is connected to an evacuation pump. When the mold is closed, as illustrated in FIG. 3, initially a portion of the molding compound is filled into the molding compound vessel 212, which portion corresponds approximately to the amount of molding compound required for filling the hollow space 208. Subsequently, when the hollow space 208 of the mold is connected to the vacuum tank through the line 229, for example, by opening a valve, the pourable molding compound in the vessel 212 is drawn into the hollow space 208. Air in the hollow space 208 is drawn off through the filter inserts 213 in the die 225 and also through the narrow annular gap between the cylinder portion 224 and the die 225. As can be easily recognized, the impact speed with which the molding compound particles impinge upon the filter inserts 213 of the die 225 and the surfaces defining the annular gap depends upon the speed at which the molding compound particles enter the hollow space 208. To reduce this impact speed at least at the outset of the filling procedure, a throttle valve, not shown, can be positioned between the hollow space 208 and the vacuum tank connected to it through line 229, so that the throttle valve initially slows down the generation of the vacuum in the hollow space 208. Accordingly, at the start of the filling operation, the molding compound particles impinge at a relatively slow speed upon the filter inserts 203 of the die 225 and the portions defining the gap between the cylinder 224 and the die 225, and porous filter packings of the molding compound grains are formed at these locations. If the molding compound is a granulate of easily destructible grains, it must be ensured that the grains are not destroyed when impinging at the suction points and particularly that the larger grain particles are not destroyed. A gentle impact of the molding compound particles at the air discharge openings 215 in the die 225 and in the annular gap between the cylinder 224 and the die 225 is also favorable influenced when the direction the molding compound particles enter at the inlet opening 211 does not lead directly to the filter inserts 213 in the die 225 and to the annular gap. On the contrary, a multiple deflection can be expected before the particles entering at inlet opening 211 into the hollow space 208 can reach the filter inserts 213 in the die 225 or the annular gap. As a result, the impact speed is further reduced.

Once porous deposits have been formed at the filter inserts 213 and in the region of the annular gap between the cylinder portion 224 and the die 225, the further filling procedure is less critical with respect to the danger of blockages. It is now possible to generate a higher vacuum in the hollow space 208, by opening the throttle valve in the line 229 between the hollow space 208 and the vacuum tank or the secondary air can be throttled.

The molding compound used may be, for example, a so-called spray grain compound, produced as follows:

A slip containing 40% by weight water and 60% by weight solids is processed. For producing a suspension, a dry material is produced consisting of 50% by weight kaolinite, 25% by weight feldspar, and 25% by weight quartz, the percentages each relating to the total dry material. The maximum grain size of the kaolinite is $25\mu$. The maximum grain size of the feldspar and the quartz is $63\mu$. Feldspar and quartz are introduced in the form of a pegmatite which contains the feldspar as well as the quartz. The material is processed by mixing water into the suspension or into the slip. The slip is then sprayed through nozzles into a hot gas atmosphere. In this hot gas atmosphere, spheres of a size of 0 to $500\mu$ are formed, wherein 80% of the total weight has a size of between 350 and $450\mu$. The spheres are hollow spheres which can be easily crushed between two fingers. The residual moisture content of the granular material obtained in this manner is about 3%.

The molding compound produced in this manner is processed in the apparatus according to FIG. 3. By simple preliminary tests, the generation of the vacuum at the beginning of the filling procedure can be easily adjusted so that the large spheres with a diameter of between 350 to $450\mu$ are essentially preserved in the regions of the filter inserts 213 of the die 225 and in the region of the annular gap between the cylinder 224 and the forces 225.

Figure 4:
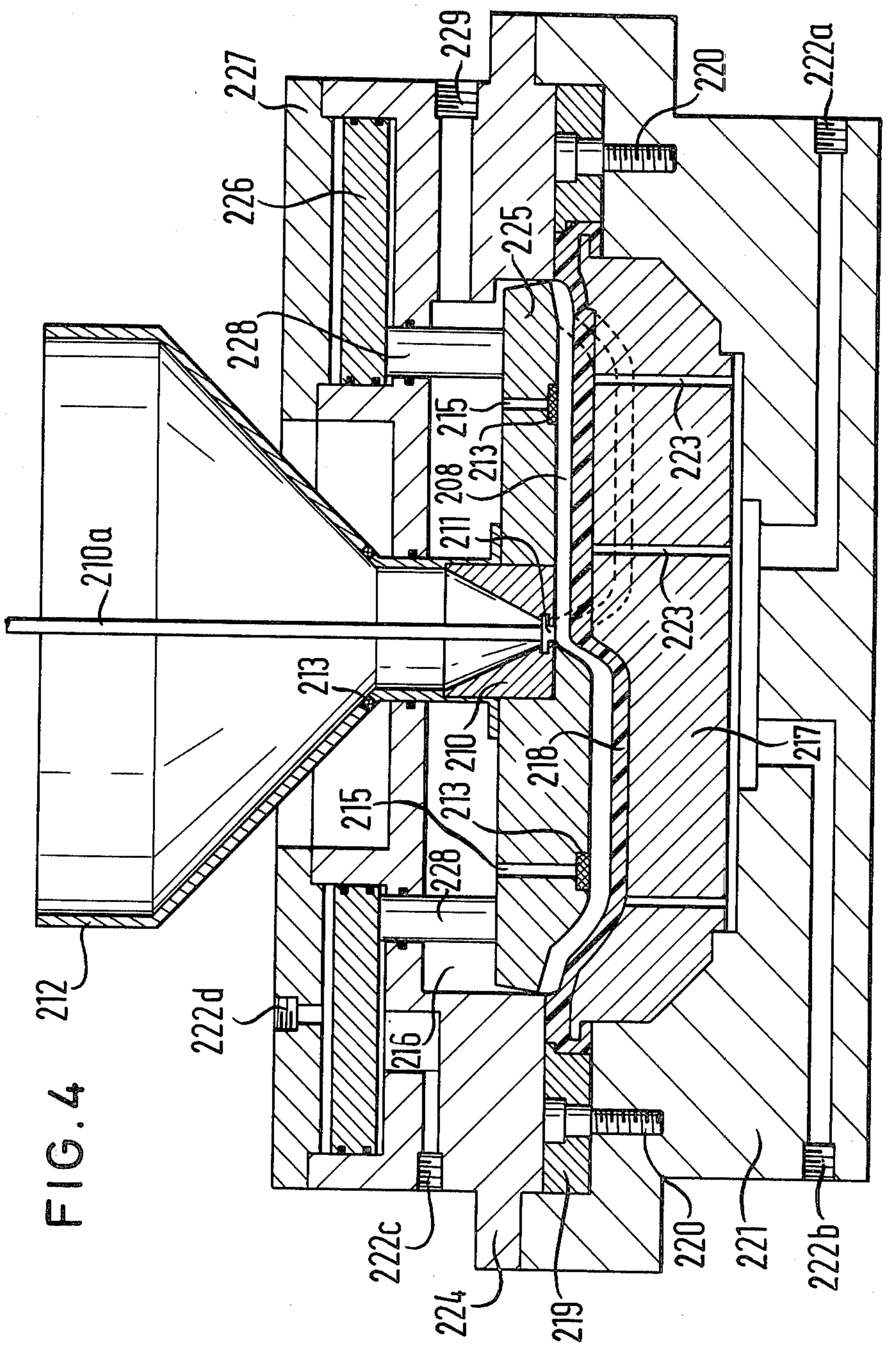
FIG. 4 shows a modification of FIG. 3.

In another modification illustrated in FIG. 4, a fluidizing air supply pipe 210a extends centrally through the molding compound vessel 212 to the inlet opening 211.

The following additional aspects are also of substantial importance for the method according to the invention:

The pneumatic filling procedure and subsequent pressing of molded articles have been known for a long time. In this regard, essentially two variables have always been decisive, namely:

1. The properties of the molding compound in relation to its pneumatic transportability, and
2. the shape of the molded article or of the corresponding hollow space in the mold.

For example, if the hollow space is variously shaped and has very narrow cross-sections, it is very difficult to fill even pneumatically. Further, a molding compound having a very low gas permeability (e.g. with high dust content) and a high inner bond (e.g. with a high and moist clay content) is also very difficult to fill into a mold pneumatically. In the compressed air pneumatic filling ("blowing" or "injecting" with excess pressure), the molding compound is mixed in a closed container with compressed air during "blowing" (for example, by means of an agitator) and the resulting mixture is then introduced into the hollow space with a high proportion of compressed air. In the hollow space of the mold, however, the proportion of compressed air frequently leads to discharge difficulties, or the filling time is increased. If "injecting" is used in a molding compound container designed in accordance with the type of the molding compound and the hollow space to be filled, and is provided with one or more outlet openings and otherwise is closed, the compressed air is introduced from several sides through narrow slots while the molding compound is flowing, with the compressed air carrying the molding compound for the filling procedure (see German Pat. No. 930,104). The air portion in the resulting mixture is significantly lower than in the case of the "blowing" mentioned above and, therefore, the filling speed is less, because substantially less air must be discharged from the mold to be filled. If this injecting process is used with molds which are difficult to fill (see above), for example, with very narrow cross-sections, it is necessary to inject from several sides simultaneously in order to achieve a satisfactory filling of the mold.

Accordingly, the "fluidization" of the molding compound with air for forming a liquid-like mixture is much less developed in the injection process than in the blowing process, wherein the latter, in addition to the disadvantages mentioned, has the further disadvantage that, due to the high portion of compressed air, there is a higher abrasive effect on the hollow spaces in the molds.

Although the described "blowing" and "injecting" has been perfected for molds which are very difficult to fill and for molding compounds which are difficult to convey (see above), it is not well suited as a filling procedure for the reasons already mentioned, especially because of the air entrapped during the subsequent compression molding. The injection process using a vacuum is available as an alternative (see German Auslegeschrift 2,653,788), however, it can only be used for easy to fill mold spaces for molding compounds which are capable of easy filling and, possibly, only with a plurality of filling openings. This occurs because the atmospheric air does not penetrate sufficiently deeply into the molding compound from the laterally arranged nozzles due to the considerably lower pressure difference in the case of vacuum filling as compared to excess pressure filling and, thus, a fluidization is effected which is totally insufficient if the filling takes place through only one opening.

Accordingly, an object of the invention is to provide a filling procedure which has the advantages of propelling the molding compound with excess pressure but which preferably is able to fill through one filling opening even the most difficult mold spaces with the narrowest cross-sections, while simultaneously avoiding entrapped air during the subsequent compression molding and which can handle the entire spectrum of molding compounds ranging from those which can be easily filled to those which are difficult to fill.

This method is "modified filling under a vacuum" in accordance with the invention.

Accordingly, a vacuum is developed in the hollow space through the mold wall and the molding compound is propelled into the hollow space and simultaneously the molding compound is fluidized. This fluidization can be effected in three different ways, depending upon the filling capability of the molding compound. For difficult to fill molding compounds (for example, those having a high dust content and moist clay content=great inner bond), the molding compound is supplied in a free fall and the amount supplied is controlled relative to the air supply at the inlet opening. In this method, the molding compound falls from an optionally adjustable height into a funnel-shaped opening, where it is dispersed into individual grains while high inner bond is dissolved as a result of the high speed of fall. The grains are surrounded by air which also falls in simultaneously and, thus, a perfect fluidization procedure is achieved. By the quantitative control of the supplied molding compound per time unit, the portion of air in the mixture of molding compound and air can be controlled so that it does not contain too much air whereby the filling duration propulsion is not necessarily extended and the vacuum is not unnecessarily increased. Further, it contains sufficient air to facilitate a perfect filling of the hollow space of the mold, i.e., the filling must be uniformly precompressed at all locations and must not have any defects.

To achieve the last-mentioned requirement for the above-mentioned molding compound which is difficult to fill and for difficult to fill mold spaces, the method must be carried out in such a way that the air is drawn from the mold space locally graduated so that an approximately uniform flow velocity of the molding compound particles is achieved during the entire filling procedure. In practice, this is achieved with the most remote locations of the mold space having the greatest suction capacity, so that they are filled first.

For molding compound having an average filling capability, the molding compound falls from a vessel into the inlet opening, and an amount of air is simultaneously supplied through a pipe whereby fluidization is achieved sufficient for a perfect filling of the mold, while the supply of excess amounts of air can be avoided.

Finally, a third filling method is available where a molding compound which can be easily filled, has a high permeability to gas and a very low inner bond, is propelled from a vessel. In this case, the permeability to gas must be so high and the inner bond so low that, when the charging level of the molding compound is at the lowest possible adjustable height, just enough air flows through the molding compound toward the inlet opening to effect a sufficient fluidization of the molding compound at the opening to effect a perfect filling of the hollow space of the mold. In practice, it has been found that a pelletized material is best suitable for this purpose. In the case of optimum pelletizing, i.e., a granulation as uniform as possible with a very high permeability to air, it is even possible in some cases to draw off the air only at the end of the hollow space and still obtain a perfect molded article.

In the filling method the danger of blockages at the suction openings must be taken into consideration.

In practice, it has been found that the tendency to develop blockages exists primarily in mold spaces which are difficult to fill and for compounds which are difficult to introduce into the hollow space. These difficulties can be removed by locating the suction openings at remote locations from the filling opening or, in most cases by proportioning the suction opening relative to the distance from the filling opening. In the remaining cases, the decreasing number of suction openings tow«rd the filling opening must be determined empirically, and an approximately constant air discharge velocity is desired. Constant air discharge velocity can be achieved by a variable throttling of the valve in the suction line, since the air resistance in the hollow space of the mold increases during the filling procedure.

We claim:

1. In a method of forming articles in a mold from a dry pourable granular molding compound, such as a ceramic, metallic or carbon containing granular molding compound, where the mold if formed of at least one part defining a hollow mold space with a central opening through which the molding compound is introduced centrally into the hollow space, and air discharge location connected to the hollow space for removing air therefrom, comprising the steps of fluidizing the molding compound adjacent the inlet opening to the hollow space, filling the fluidized molding compound into the hollow space through the inlet opening by drawing air out of the hollow space through the air discharge locations, compressing the molding compound filled into the hollow space to provide a precompressed body of the molded material, and subsequently pressing the precompressed body of the molded material into a molded article, wherein the improvement comprises drawing the air out of the hollow space at least at locations along the maximum circumferential periphery of the hollow space, limiting the inflow speed of the granular mold compound at the commencement of filling the compound into the hollow space for reducing the impact of the grains of the granular molding compound at the air discharge locations and providing a porous build-up of the molding compound at the air discharge locations so that the air discharge locations are not blocked by particles of the molding compound grains broken by impacting at too high a speed around the air discharge locations.

2. Method, as set forth in claim 1, including drawing the air out of the hollow space through air discharge openings located between the maximum circumferential periphery of the hollow space and the central inlet opening.

3. Method, as set forth in claim 1 or 2, including the step of controlling the drawing off of air from the hollow space while the hollow space is being filled with the granular molding compound for maintaining an approximately uniform flow speed of the grains of the molding material entering the hollow space until ther point of impact within the hollow space.

4. Method, as set forth in claim 1 or 2, including fluidizing the molding compound entering into the hollow space by feeding air into the molding compound immediately adjacent the inlet opening into the hollow space.

5. Method, as set forth in claim 1 or 2, including fluidizing the molding compound by supplying fluidizing air through a line located within the inlet opening with the line opening into the hollow space.

6. Method, as set forth in claim 1 or 2, including the step of maintaining a vacuum in the hollow space with the pressure therein in the range of 0.7 to 0.1 bar.

7. Method, as set forth in claim 1 or 2, including the steps of controlling the drawing of the air out of the hollow space by supplying additional air exteriorly of the hollow space and in communication with the air discharge locations for limiting the impact velocity of the molding compound grains flowing to the air discharge locations.

8. Method, as set forth in claim 1 or 2, including controlling the drawing off of the air from the hollow space by throttling the draw-off air at a location spaced from the hollow space.

9. Method, as set forth in claim 1 or 2, including the step of using a molding compound where the individual grains have a range of sizes, and controlling the impact velocity of the grains within the hollow space so that at least the larger grains remain unbroken.

10. Method, as set forth in claim 1, including the step of pressing the precompressed molding compound into the molded article within the hollow space in the mold.

11. Method, as set forth in claim 10, including the step of maintaining the vacuum in the hollow space during the pressing of the molded article.

* * * * *